May 13, 1969  F. W. HAGEN  3,443,431
STATIC PRESSURE SENSING DEVICE
Filed July 6, 1967  Sheet 1 of 2
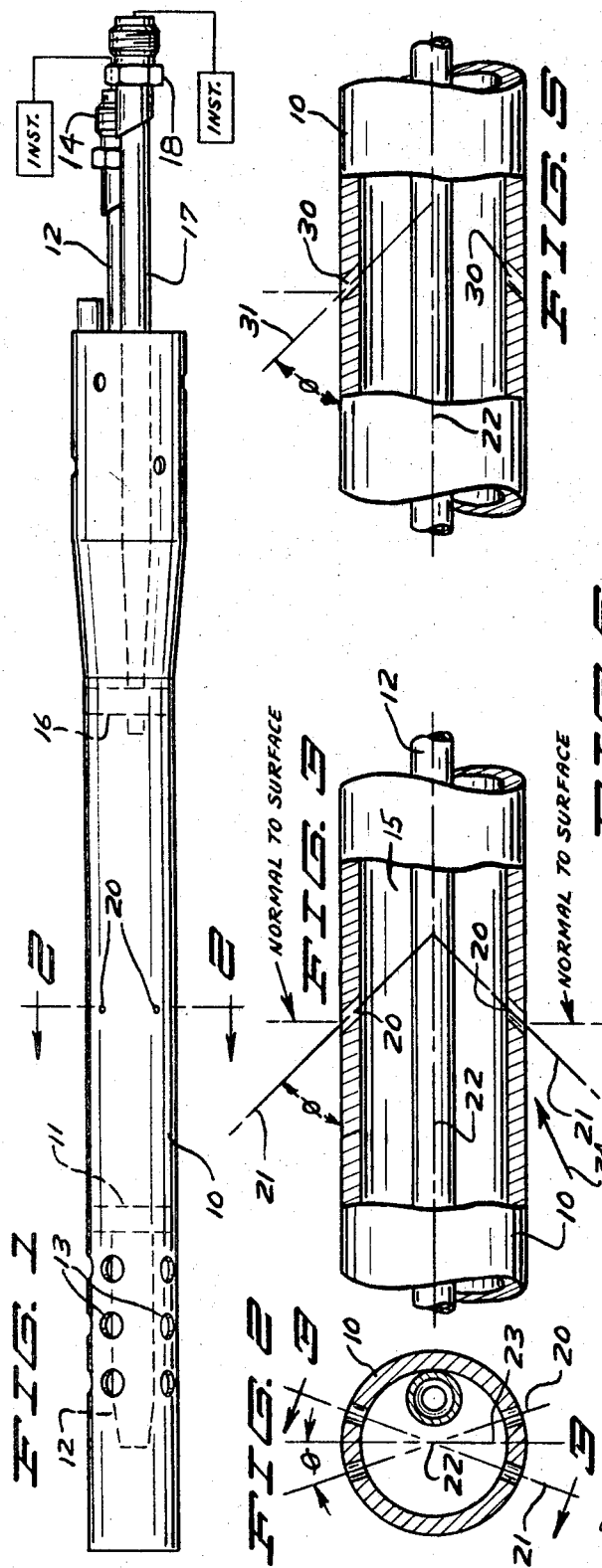
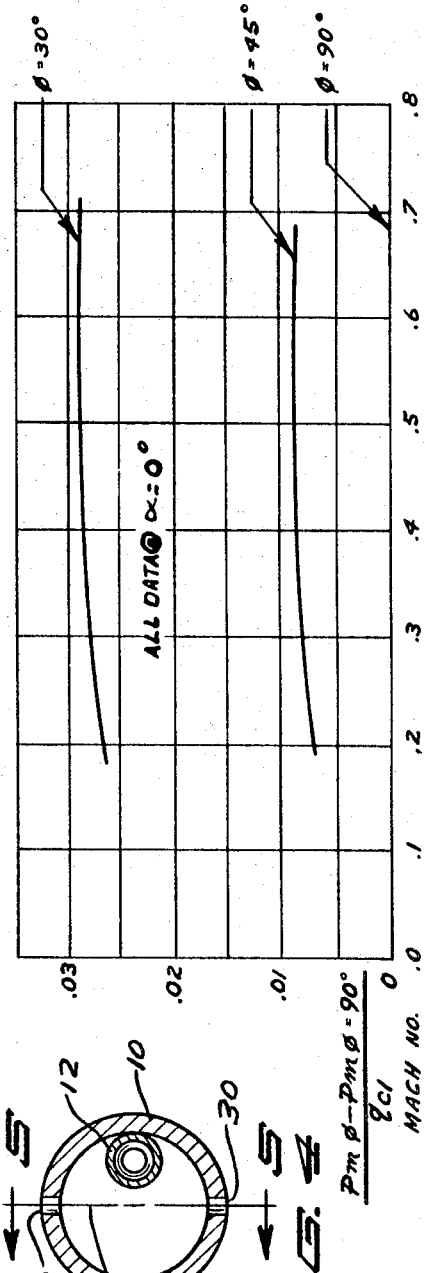
INVENTOR.
FLOYD W. HAGEN
BY
Dugger, Peterson, Johnson + Westman
ATTORNEYS

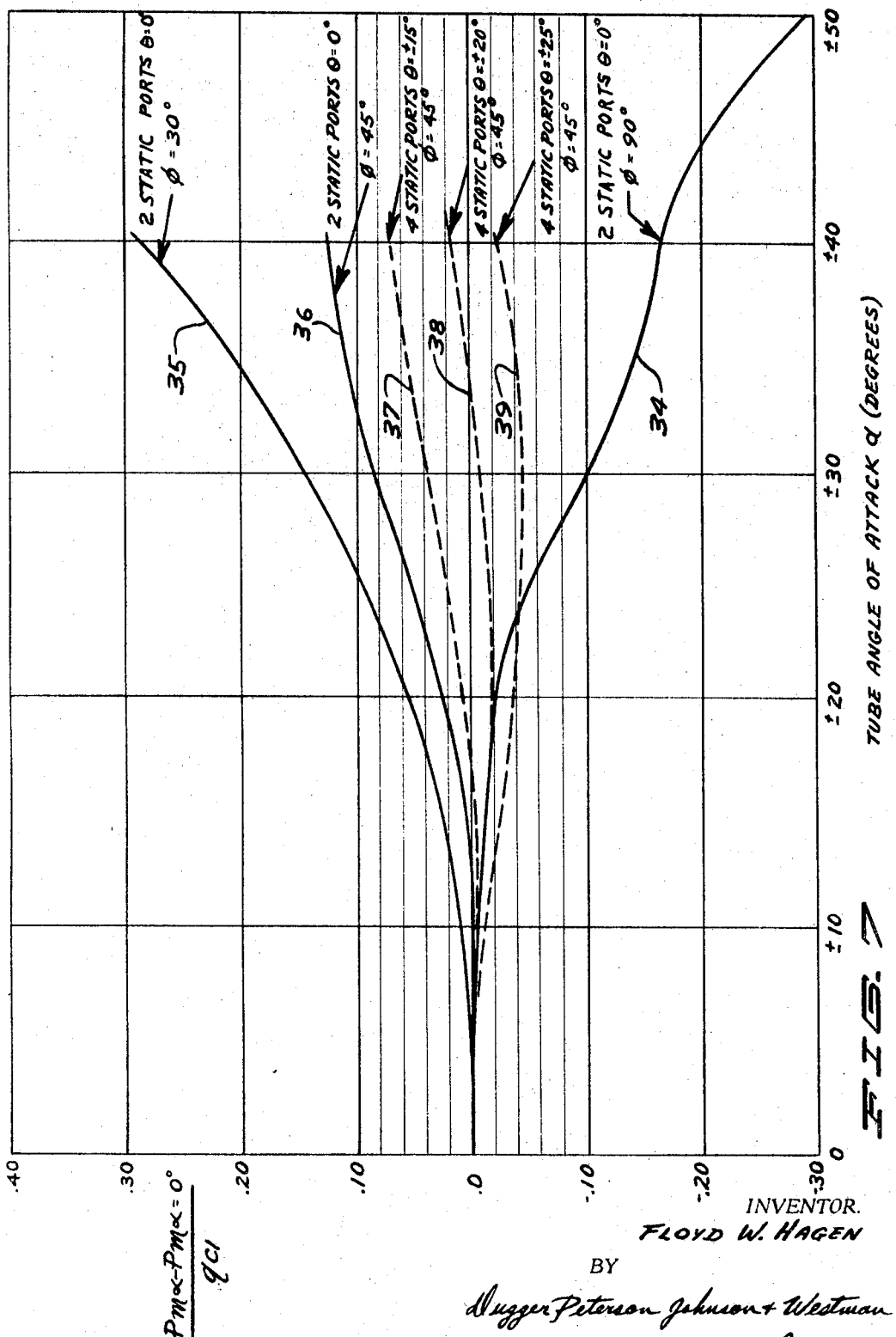

United States Patent Office 3,443,431
Patented May 13, 1969

3,443,431
STATIC PRESSURE SENSING DEVICE
Floyd W. Hagen, Minneapolis, Minn., assignor to Rosemount Engineering Company, Minneapolis, Minn., a corporation of Minnesota
Filed July 6, 1967, Ser. No. 651,472
Int. Cl. G01c *21/00*
U.S. Cl. 73—178                                10 Claims

ABSTRACT OF THE DISCLOSURE

A static pressure measuring device such as a tube or probe for measuring static pressure in an aircraft wherein the static pressure measurement is compensated for across a wide range of angle of attack, and particularly at high angles of attack which are commonly encountered in present day aircraft. The static pressure apertures are drilled into the static tube and are drilled so that their axes are inclined forwardly from a position normal to the surface of the static tube itself. Two forms of the invention are shown. One form of the probe has two static pressure apertures, one at the top of the probe and one at the bottom, and the other form is shown with a plurality of static apertures angularly spaced on the periphery of the probe. In each instance, the axes of the apertures are inclined forwardly from a plane normal to the surface of the probe itself.

BACKGROUND OF THE INVENTION

Field of the invention

The present invention relates to static sensing devices, primarily static tubes for mounting on aircraft and improvements therein which permit obtaining of proper readings at high angles of attack or in other words where the direction of the flow of the impinging air, with respect to a reference axis on the device changes a great deal.

Description of the prior art

In prior art devices, the static pressure ports which are normally drilled into a combination pitot-static tube mounted on an aircraft or flight vehicle, or are drilled into a separate static measuring probe also mounted on the flight vehicle, or in the case of missiles, can be drilled right into the missile body, are all made so that the axes of the apertures defining each of the ports is normal to the surface or that portion of a surface into which the aperture is drilled or defined. In other words, in the case of a cylindrical tube, the axes of the static pressure sensing apertures are perpendicular to the longitudinal axis of the cylindrical tube and extend radially out. In some instances static pressure sensing apertures have been drilled into very slightly inclined surfaces, such as a long gently tapered cone surface and, in these instances, the axes of the static pressure sensing apertures are usually normal to the surface in which the aperture is defined. Stated another way, the axes are normal to an imaginary surface over the aperture formed by a projection or extension of the surface of the probe to cover the aperture.

In this situation, particularly where the static pressure sensing apertures are mounted on a cylindrical probe, as is the usual case, there is a wide variation in performance of this static measuring device when subjected to variable angles of attack. Particularly, when the angles of attack get as high as is now common in high performance aircraft, in the range of plus or minus forty to fifty degrees, the static pressure readings from conventional instruments become unreliable and difficult to compensate. This is due to the change of air flow patterns past the probe which cause a partial impact pressure on the windward side of the probe and a lower pressure on the leeward side.

The present invention permits the compensation for these variations by proper positioning of the axes of the static pressure sensing apertures other than normal to the surface into which they are drilled. By further variations of providing several apertures around the periphery, any type of compensation can be achieved, even compensation which will be effective when the probe is subjected to both angle of attack and sideslip.

SUMMARY OF THE INVENTION

The invention thus deals with a static pressure sensing probe which has static pressure sensing apertures defined therein, and said apertures are located so their axes are not normal to the surface into which they are drilled.

BRIEF DESCRIPTION OF THE DRAWINGS

FIGURE 1 is a side elevational view of a typical pitot static probe used in high performance aircraft and having static pressure sensing apertures defined therein and positioned according to the present invention;

FIGURE 2 is a sectional view taken as on line 2—2 in FIGURE 1;

FIGURE 3 is a sectional view taken as on line 3—3 in FIGURE 2;

FIGURE 4 is a vertical sectional view taken substantially on the same line as FIGURE 2 showing a modification of the present invention;

FIGURE 5 is a sectional view taken as on line 5—5 in FIGURE 4;

FIGURE 6 is a graphical representation of the performance of static pressure sensing apertures when located on a probe according to the present invention, in relation to Mach number; and FIGURE 7 is a schematic representation showing the effect of angle of attack on the performance of a probe having static pressure sensing apertures of the present invention.

DESCRIPTION OF THE PREFERRED EMBODIMENT

A shielded pitot-static tube illustrated generally at 10 has an outer configuration that is normally and conventionally used as an aircraft probe. The shielded pitot-static tube is used for measuring pitot pressures at extremely high angles of attack. The shielded tube includes a forward compartment or chamber having an open front end and divided from the rest of the tube by a bulkhead shown in dotted lines at 11. The front portion of the pitot pressure measuring tube 12 extends into this chamber and air flowing through the open front end of the tube will impinge against the pitot pressure sensing orifice of the pitot tube 12 and will discharge out through exit holes 13 positioned to the rear of the pitot pressure sensing orifice. The pitot tube 12 extends rearwardly and has suitable fittings 14 for attaching it to remote instruments (shown schematically). The pitot-static tube further has an interior static pressure chamber 15 defined between bulkhead 11 and a second bulkhead 16 positioned rearwardly of the bulkhead 11. A static pressure carrying tube 17 leads from this chamber and has fittings 18 suitable for connection to remote instruments (shown schematically).

The pitot tube passes through the static chamber, but it is sealed with respect thereto.

A plurality of static pressure sensing apertures 20 as shown in FIGURES 2 and 3, are drilled through the wall of the cylindrical tube. The apertures 20 actually form small cylindrical passageways having axes 21. As shown in FIGURES 2 and 3, the axes of the apertures are arranged in angular relationship in two directions. The basic angular positioning is that the axes 21 of the apertures 20 incline forwardly as they go outwardly from the tube, with respect to a plane generally tangent to the surface or imaginary surface where the aperture emerges from the tube. This tangent plane is parallel to the direction of air flow past the aperture when the probe angle of attack is zero. In addition, the axis 21 of each of the apertures is inclined at an angle with respect to a vertical reference plane indicated at 23. In a cylindrical tube as shown, the axes of the apertures incline with respect to the longitudinal axis 22 of the tube.

In prior art teachings, the axes of the static pressure ports or apertures are positioned normal to the surface through which the apertures pass. The axes of the apertured intersect an imaginary surface which forms the continuation of the true surface of the tube itself. At the commencement of drilling, of course, this imaginary surface is very real. It is with respect to the intersection of this imaginary surface forming the continuation of the true outer surface of the tube and the aperture axis that the angular measurement $\phi$ is made in this description.

Now, referring to FIGURE 3, it will be seen that the axes 21 of the static pressure sensing apertures 20 form an included angle $\phi$ of 45° as shown, with the imaginary surface forming a continuation of a surface into which the apertures are drilled. This is right at the intersection of the imaginary surface and the axis of one of the apertures and each is measured in the plane defined by the axis of the aperture and the longitudinal axis of the probe.

In the situation as shown in FIGURES 2 and 3, four apertures are shown and the angle $\theta$ of their axes with respect to the vertical plane 23 is shown at substantially 20°. The positioning of the static apertures or ports so that their axes are at an angle other than normal to the imaginary surface forming the continuation of the surface in which the aperture is drilled, gives unexpected results in compensating for static pressure errors which are encountered in the conventional pitot-static tubes when the aircraft is at high angle of attack.

Angles of attack up to ±50° are not uncommon in today's high performance aircraft. This is particularly true in vertical take off and landing (VTOL) aircraft or short take off and landing (STOL) aircraft. What happens in the usual case is that an impinging air stream strikes the static pressure ports and causes erroneous readings between the measured static pressures and true local static pressure. Because static pressure measurement is a very important parameter for determining performance of aircraft, it is critical to obtain as true a measured static pressure as possible. With the axes of the apertures positioned other than normal to the imaginary surface forming a continuation of the surface in which the apertures are drilled and inclined in forwardly direction with respect to the direction of movement through the air at zero angle of attack (the axes are inclined against the air flow direction as they extend outwardly), the apertures arrangement can be made so that the static pressure will remain relatively constant over a wide range of angle of attack or can be made so that a positive pressure or negative pressure aerodynamic compensation can be provided as a function of angle of attack. Static pressure compensation can also be achieved at zero angle of attack by varying the inclination angles of the axes of the static ports or apertures. This may be useful for compensating for errors caused by mounting the probe close to the fuselage of an aircraft or for other irregularities.

In the present device where the axes of the apertures incline forwardly and outwardly from the tube, the air flow vector, if the tube is at a plus angle of attack, will impinge on the bottom surface of the tube in much the direction indicated by the arrow 24. Static pressure at the bottom apertures is higher than the pressure in the vicinity of the apertures in the leeward side, or top side as shown. This causes a flow of air in the apertures at the bottom side or windward side and out of the apertures on the leeward side. The flow passing out of the leeward apertures is ejected upstream against the component of the free stream velocity or normal air flow, which is flowing substantially parallel to the pitot-static tube. This in effect restricts the flow of air from leaving the leeward apertures freely. This causes a pressure in the static pressure chamber 15 which is higher than the average of the pressures in the vicinity of the windward and leeward apertures if no flow were passing through the apertures.

In FIGURES 4 and 5, another configuration of static apertures is shown wherein there are only two static ports or apertures, one at the top and one at the bottom, and wherein the axes of these apertures lie in the vertical plane 23. However, in this situation, the apertures 30 have axes 31 which are again inclined forwardly from the longitudinal axis of the tube as the axes move outwardly from the tube. The included angle here again is 45° as shown.

For convenience of illustration, the included angle between the vertical plane and the axes as shown in FIGURE 2 will be called $\theta$ and the angle of the axes with respect to the surface in which the apertures are formed is called $\phi$. In FIGURE 7, the solid lines indicate the performance of the unit in relation to angle of attack when there are only two static apertures and $\theta$ is equal to zero. This in other words is when the axes of the apertures lie on the vertical plane, as shown in FIGURE 4. The parameter for the base of the graph is an angle of attack ($\alpha$), either plus or minus.

The parameter illustrated on the vertical axis of the graph of FIGURE 7 is the formula $$\frac{P_{m\alpha} - P_{m\alpha=0°}}{q_{c1}}$$

where $q_{c1}$ equals the local pitot pressure minus the local static pressure; $p_{m\alpha}$ equals the measured static pressure at any angle; and $p_{m\alpha=0°}$ is the measure of static pressure for an angle of attack of zero.

Correlating this information, it is first of interest to note the bottom curve 34 which is the result obtained where the axes of the static apertures were normal to the imaginary surface which is formed from a continuation of the cylindrical surface in which the static apertures were drilled. In this case there were two static ports, one at the top of the tube and one at the bottom of the tube. In the case shown, this axis would be perpendicular to the longitudinal axis of the tube. It can be seen that the pressure parameter goes negative as the angle of attack increases, and that the change starts to become appreciable at angles of attack of approximately 20°.

Next, referring to curve 35, the $\phi$ angle was 30° with respect to the longitudinal axis of the tube. It will be noted that a plus compensation was obtained by this extreme forward inclination of the axes of the static pressure sensing aperture. This is opposed to that obtained when the angle was 90°. For a second aperture orientation, curve 36 shows that when the $\phi$ angle is 45° as shown in FIGURE 5, the plus compensation still occurs but it is of lesser magnitude than that with the 30° angle. Therefore it can be seen that by properly selecting the $\phi$ angle, or the angle of inclination of the ports in the forwardly direction with respect to the surface of the probe, plus compensation can be obtained. Further, it can be interpolated that someplace between an angle of 45° and 90°, the compensations will be substantially zero or in other words, the measured static pressure will not be greatly affected by the angle of attack. Assuming the same true static pressure, the static pressure measured at 0° angle of attack will be nearly the same as it is at the high angles of attack.

Where four apertures have been used as shown in FIGURES 2 and 3, the results are shown in dashed lines on FIGURE 7. In this instance, the $\phi$ angle is held at 45° inclination as shown in FIGURE 2 and the $\theta$ angle is varied. At a point where there were four static apertures and $\theta$ was plus or minus 15°, curve 37 resulted. This again gave a plus compensation using the same formula for the vertical scale. When the static ports were moved to a $\theta$ angle of plus or minus 20°, as shown, the curve 38 resulted and this lies substantially along the 0 line with very little deviation. It should be noted that there is initially a slight negative compensation and after an angle of attack of about 35°, the compensation moved toward plus. It can be assumed that changing the $\theta$ and $\phi$ angles slightly would make this curve straighter and more closely along the 0 line.

With the $\theta$ angle at ±25° for four static apertures again with the $\phi$ angle at 45°, the curve 39 resulted and this has a greater negative compensation than the other curves, being negative even at ±40° angles of attack, although it is starting to move toward the 0 line at angles of attack at ±30°.

All of the tests run which resulted in the curves of FIGURE 7, were at a Mach number of .5.

FIGURE 6 shows the influence of Mach number on the readings at different $\phi$ angles for 0° tube angle of attack. In this case, Mach number is shown on the horizontal scale (all of these are below Mach 1) and the vertical scale is represented by the formula $$\frac{(p_{m\phi}) - (p_{m\phi=0°})}{q_{c1}}$$

where $p_{m\phi}$ equals static pressure measured with the aperture inclined at an angle $\phi$. $p_{m\phi=90°}$ is the static pressure measured when $\phi$ equals 90°. $q_{c1}$ is the local impact pressure derived as previously explained.

It can be seen that at the angles tested, 30°, 45° and 90°, there was a slight shift in the relationship at the different $\phi$ angles, but that for each $\phi$ angle the curves were substantially flat over a broad range of Mach number. This would mean that use at the Mach numbers shown, they would not cause difficulties because the results would be substantially not influenced by Mach number. Again this is at Mach numbers below Mach 1.

Thus, the invention relates to the new discovery of compensating means for static pressure readings at high angles of attack through the inclination of the axes of the static pressure apertures in a forwardly direction, in relation to a line on the intersection of the aperture axis and an imaginary surface extending over the aperture and forming a continuation of the surface in which the port is formed and which is normal to the imaginary surface. There is only one normal line for each aperture. In cylindrical probes, the angle of the axis of the aperture is measured in a plane defined by the axis of the aperture and the longitudinal axis of the probe. The normal line also lies in this plane. The particular probe cross-section determines where the measurement is made.

What is claimed is:

1. A static pressure sensing instrument comprising a probe having means for mounting said probe in a location where there is relative motion between the probe and a fluid, said probe having a wall defining a chamber, means for sensing the pressure inside said chamber, a plurality of apertures defined through the wall of said chamber, said apertures having axes, each axis being inclined forwardly at an acute angle with respect to a reference line normal to the imaginary surface over the aperture generally forming a continuation of the outer surface of said probe, said reference line intersecting the imaginary surface at the point of intersection of said axis and said imaginary surface.

2. In a static pressure measuring device, a probe having a wall defining an interior chamber, means to mount said probe on an object wherein there is relative motion between the probe and a fluid, said wall having an outer surface generated about a longitudinal axis, means for sensing the pressure inside said chamber, a plurality of apertures defined in said wall and leading into said chamber, said apertures each having an axis which is inclined forwardly at an acute angle with respect to a reference line normal to the outer surface of said probe and passing through the intersection of said axis and an imaginary surface over said aperture and forming an extension of the surface of said probe.

3. The combination as specified in claim 2 wherein the axis for each aperture lies in the plane defined by said reference line of that aperture and the longitudinal axis of said probe.

4. The combination as specified in claim 2 wherein said probe has a normal position with respect to a vertical plane, and wherein each of said apertures is positioned at substantially equal angles with respect to and on opposite sides of said vertical plane from another aperture.

5. The combination as specified in claim 2 wherein said probe is substantially cylindrical and has a forward end on which air impinges, and wherein said axes of said apertures incline in direction forwardly from a plane normal to said longitudinal axis.

6. In a static pressure sensing device for mounting on aircraft and for compensating static pressure measurements made at high angles of attack of said aircraft, the improvement comprising a static pressure sensing probe, means to mount said probe on said aircraft, said probe having a longitudinal axis at a predetermined relationship to the normal longitudinal flight axis of said aircraft, said probe having a wall defining a static pressure chamber, a plurality of apertures defined in the wall and leading into said static pressure chamber, said apertures having axes which incline forwardly at the exterior of said probe and each of which are oblique with respect to an imaginary surface covering its associated aperture and lying in place of the surface removed when the aperture was formed.

7. The combination as specified in claim 6 wherein there are two apertures, one at the top and one at the bottom of said probe when the aircraft is in its normal position, and wherein the axes of said apertures and the longitudinal axis of said probe define a plane.

8. The combination as specified in claim 6 wherein there are an even number of apertures, more than two, and wherein the axes of the apertures are positioned so that the apertures are arranged in pairs, one aperture of each pair being on opposite sides of the probe, each pair having its axes and the axis of said probe lying in a plane, and wherein the planes defined by the axes of each pair of apertures are positioned at a preselected relationship to a vertical plane passing through the longitudinal axis of said probe.

9. The combination as specified in claim 6 wherein there are two pairs of apertures, and the axes of each pair define a plane, and wherein the planes defined by each pair of apertures are at equal and opposite angles with respect to a vertical plane passing through the longitudinal axis of said probe.

10. The combination as specified in claim 6 wherein the outer surface of the probe is positioned in relation to the aircraft so that when the aircraft is at 0° angle of attack, the air stream does not directly impinge upon any portion of the apertures.

References Cited

UNITED STATES PATENTS 2,923,152   2/1960   Marby et al. _____ 73—182 XR
3,034,353   5/1962   Anderson _____ 73—212

LOUIS R. PRINCE, *Primary Examiner.*

DONALD O. WOODIEL, *Assistant Examiner.*

U.S. Cl. X.R.

73—182, 212